May 22, 1934. W. C. SPIKER Re. 19,178
GOLF PUTTER
Original Filed May 31, 1928
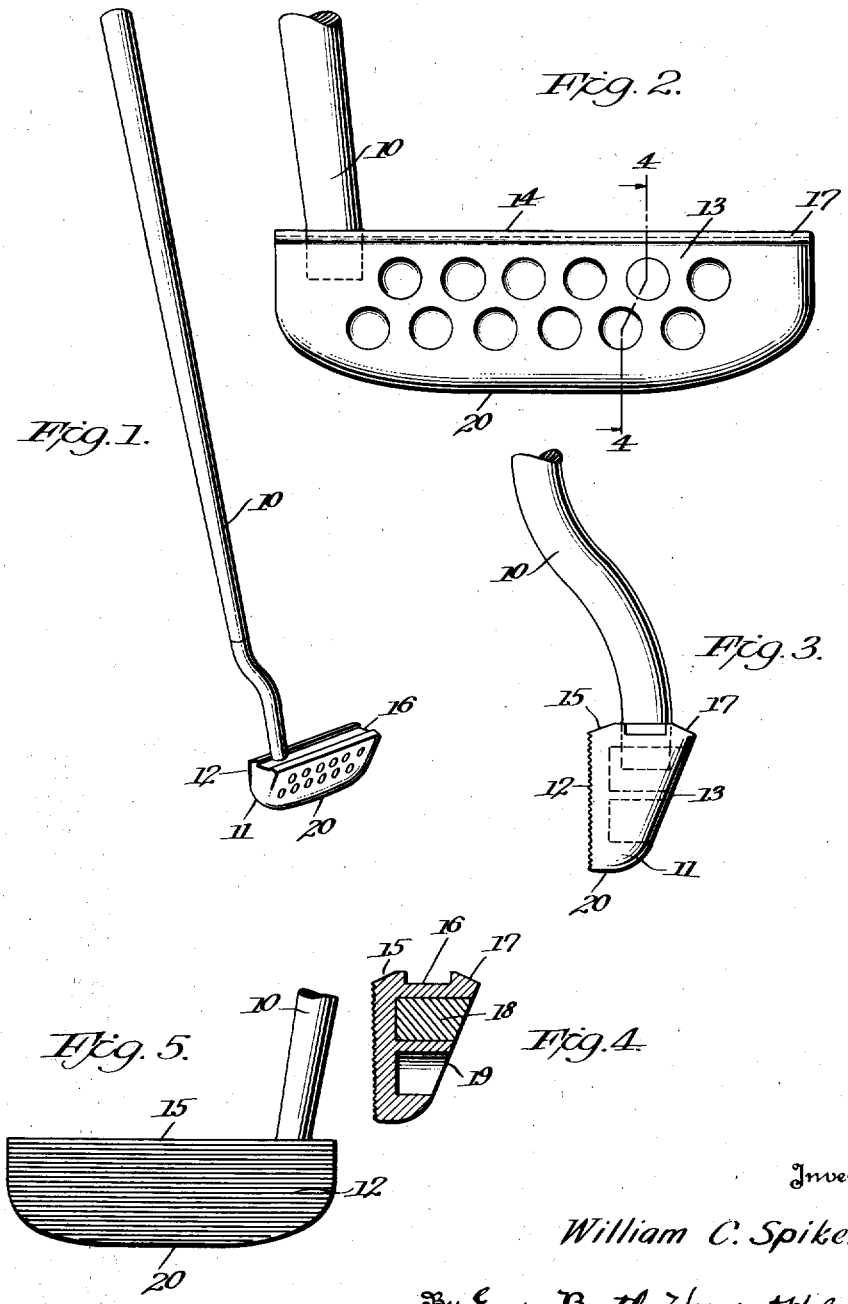
Inventor
William C. Spiker,
By Emery, Booth, Varney & Holcombe
his Attorneys Reissued May 22, 1934

Re. 19,178

UNITED STATES PATENT OFFICE 19,178

GOLF PUTTER

William C. Spiker, Atlanta, Ga.

Original No. 1,756,219, dated April 29, 1930, Serial No. 281,884, May 31, 1928. Application for reissue February 26, 1931, Serial No. 518,565

10 Claims. (Cl. 273—77)

The present invention relates to golf clubs of the putter type and aims generally to improve existing putters in the combinations and arrangements of elements as hereinafter described.

The purpose of the invention is to provide a club or putter that will materially assist the player in his game and particularly aid in directing the ball to the desired goal. In other words it is proposed to design a putter which will facilitate finding the correct position of the club with relation to the ball at the moment of striking, and to insure the holding of the club in such a manner that its striking face will be perpendicular to the intended line of travel of the ball as well as to accurately roll the ball in a truer course toward the objective.

With putters and approach clubs now in use ordinarily all but the striking surface thereof is curved and the corner angles divergent. This more or less distracts the player in addressing the ball as he has only the lower edge of the club from which to judge the angular position with regard to the intended path of the ball. Also from a scientific point of view and as has been proved practically, the striking face of a putter should be vertical or lean slightly forward. With no loft on a putter or with the striking face tilted forward the lower edge of the putter is out of sight of the player so that the one guide line he now has is obscured from view.

To overcome these disadvantages, I propose to design a non-lofting putter essentially like any other putter, namely wherein the center of gravity is between the center of the head and toe, but characterized by having all of its edges visible to the player (namely, the top surface of the head) symmetrical about its central transverse axis and preferably disposed parallel with any horizontal line in the putting face of the putter or parallel to a tangent to the lower edge in case it is curved, and in like manner parallel with the putting green, thereby assisting the player in holding the club head normal to the line of proposed travel of the golf ball; and to the end of accentuating the importance of this detail I prefer to have the top or visible portion of the club of truly rectangular outline and its surface preferably marked with grooves or stripes or other suitable sighting means which may advantageously be of distinguishing colors. Furthermore, to secure proper balance of the putter head, the rear face thereof, which is opposite the striking face and normally out of the view of the player, is recessed, this arrangement permitting maintaining the center of gravity of the head between its center and toe, without destroying the symmetrical design of the top surface.

In addition to the aforesaid characteristics the club possesses other features of essential novelty that will be apparent from the following detailed description.

The invention is shown by way of illustration in the accompanying drawing, wherein Fig. 1 is a perspective view of the club;

Fig. 2 is a similar view on a larger scale with the handle partly broken away;

Fig. 3 is an elevational view of Fig. 2 seen from the heel end;

Fig. 4 is a transverse sectional view taken on the line 4—4 of Fig. 2; and

Fig. 5 is a front elevational view showing the putting surface.

Referring to the construction in further detail the handle shaft 10 is secured in any suitable manner near one end of the club or putter head 11, and at the desired inclined angle thereto as is customary. The club head in its entirety is not necessarily longer than ordinary putters but as already indicated is characterized by its parallel straight-line design, hence the name "straight putter" is an appropriate designation therefor.

In transverse cross-section (Fig. 4) the putter head is not unlike an inverted trapezoid, i. e. with one long side uppermost, and having a non-lofting striking or putting face 12 thereof disposed substantially at right angles to the top or upper surface 14 which in shape is symmetrical about its central transverse axis, preferably rectangular in outline as shown in Fig. 1. As stated above, the putting surface 12 may lean slightly forward which is desirable in securing a more accurate roll of the ball. The surface 13 is disposed approximately at an acute angle with the putting face 12, and the lower portion or sole 20 is advantageously straight medially of the head parallel to the edges of the top surface 14 and may be appreciably curved at the ends thereof.

The top surface 14 may be formed with a longitudinal groove 16 running substantially the entire length of the head and forming two similar ledges 15 and 17, whose upper surfaces may be bevelled and oppositely disposed as shown in Fig. 4, and afford prominent fields for sighting means or indicia. The longitudinally running edges of the portions 15 and 17 are disposed in true parallelism with the putting face 12 of the club, and in like manner the sharp edges of said groove and the ledges run parallel with said putting surface. With this arrangement it will be apparent that at whatever angle the light rays strike the top surface 14 of the head at least one of its rectangular sections will be clearly visible to the golfer. In order to still further emphasize this parallelism and its visibility it is proposed to paint the upper surfaces of said groove and ledges (i. e. sections 15, 16 and 17) in different contrasting colors thus making them stand out still better from each other and from the ground or putting green.

The putting face 12 may have thereon any marking desired or may be entirely free of such marking. However, for the purpose of securing a surface or face best adapted for taking hold of the ball and for the further purpose of carrying out the essential feature of parallel lines and conspicuous corners, as above explained, it is proposed to have said putting face provided with a multiplicity of parallel grooves forming ridges all lying in substantially the same plane and parallel with the edges and marked faces on the top 14 of the putter as shown.

From the above it is apparent that the upper surface of head 11 which is larger than any horizontal cross-section of the head, is the only surface subject to view by the player in making the putting stroke. This is particularly true when the putting face 12 is non-lofting and is perpendicular to the top surface or leans slightly forward, so that the upper surface constitutes the sole sighting means visible to the player.

The head is unusually thick, that is, of the block type, and is preferably made from metal or a combination of materials having different specific gravities in order to obtain or to assist in obtaining the proper balancing thereof, because on account of its uniform cross-section the center of gravity would naturally fall nearer the heel end than is usual. To compensate for this and to maintain the center of gravity between its center and toe, there are provided staggered rows of recesses or holes 19 bored or otherwise formed in the club from the rear surface 13 thereof as shown in Fig. 4. By this means not only the proper balance but also the proper weight of the head may be obtained without affecting the essential parallelism of the lines which the player can see in the act of using the club. As different players require certain weights and balances for their clubs, some of these holes may be plugged with lead or other heavy material as indicated at 18, and since these holes are bored in the club from the rear and concealed surface 13, which appreciably slants away from the top or sighting surface 14, said holes or plugs are not visible to the golfer during action and cannot therefore distract him from his play. Any variation in the balance can, of course, be easily made by selectively plugging up the proper holes.

It is to be understood that the invention as herein disclosed is not limited to the details of construction shown and described as these may be varied without departing from the spirit of the invention as defined by the claims.

I claim:

1. A putter head having in combination plain flat upper surfaces of rectangular shape, a lightly marked striking face, a plain bottom face narrower than top face and preferably sloped upward toward the ends and toward the back face, said head being recessed beneath the top surface and back of the striking face to position the center of gravity of the head between its center and toe to secure balance, the longitudinal edges of the top surface being parallel to the central portion of the lower edge of the striking face, and the top surfaces of the putter head extending beyond the boundaries of any lower horizontal section through the head to such an extent that only the top surfaces are in view of the player while he is executing a play, substantially as shown and described.

2. A golf club comprising a polygonal shaped head or body portion with its center of gravity between its center and toe provided with a top surface of substantial width and symmetrical about a central transverse axis and having its side edges parallel and a non-lofting striking surface having the major portion of its lower edge also parallel with said top parallel edges, the area of the top surface being such that it conceals from the view of the player all other edges of the putter head, thus constituting sole sighting means in making the stroke.

3. A putter head as described in claim 2 characterized by sighting means in the top parallel to longitudinal top edges.

4. A golf club head comprising a polygonal body portion with its center of gravity between the center of the head and toe having a substantially flat upper surface rectangular in outline and longitudinally arranged lines of demarkation disposed parallel with the side edges thereof, said top surface and lines providing a multiplicity of parallel sighting means, the opposite sides of the body converging towards the sole and forming substantially rectangular fields, the striking surface having the major portion of its bottom edge parallel with said top edges, and a shaft disposed at an inclined angle to the upper surface.

5. A putter head of the character described having horizontal sole and top surfaces and its center of gravity between the center and toe, the top surface being of rectangular outline and of such substantial width that it only is visible to the player when making the stroke, the striking face of said head being non-lofting and substantially at right angles to said top surface whereby true parallelism is maintained between the surface of the putting green and the edges of said faces.

6. A putter head of the block type for securing a substantial mass behind the ball having a top surface substantially rectangular and symmetrical about its central transverse axis, the body of said putter below the top surface being of smaller area than the top surface on any horizontal section and of irregular shape with the center of gravity between its center and toe.

7. A putter head having a top surface of substantial width symmetrical about its central transverse axis and deeply recessed in its rear face below the top surface so as to cause the center of gravity of the head to be between its center and toe, the top surface of said head being of greater area than any horizontal section through said head, whereby to hide from the view of the player all other edges including said recessed face.

8. A putter head having its center of gravity between its center and toe and a top surface and a non-lofting striking face both symmetrical about a central transverse axis, the top surface of said head being substantially rectangular and of greater length and width than any horizontal section therethrough.

9. A head for a golf club of the character described having a top surface of substantially rectangular outline and a ball striking face disposed at substantially right angles thereto, said top surface being grooved providing spaced fields, the side edges of which lie in parallel relation with bottom edge of said striking face, whereby a field of the top surface will be distinctly visible to the player under different conditions of light and constitute sighting means when making a stroke.

10. A head for a golf club of the character described having a top surface of substantially rectangular outline and a ball striking face disposed at substantially a right angle thereto, a longitudinal groove formed medially in said top surface and extending the entire length thereof, said groove providing similar fields to either side and said fields being oppositely bevelled, the bottom surface of the groove and said bevelled surfaces having their side edges all lying in parallel relation and adapted to have contrasting colors whereby one field of the top surface will be visible at whatever angle the light rays strike said top surface, for the purpose set forth.

WILLIAM C. SPIKER.